(12) United States Patent
Ernst et al.

(10) Patent No.: US 10,974,835 B2
(45) Date of Patent: Apr. 13, 2021

(54) BLEED AIR TEMPERATURE AND FLOW CONTROL SYSTEM

(71) Applicant: Hamilton Sundstrand Corporation, Charlotte, NC (US)

(72) Inventors: Jeffrey Ernst, Wethersfield, CT (US); Tony Ho, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 330 days.

(21) Appl. No.: 15/925,047

(22) Filed: Mar. 19, 2018

(65) Prior Publication Data
US 2019/0283887 A1 Sep. 19, 2019

(51) Int. Cl.
| | |
|---|---|
| *B64D 13/08* | (2006.01) |
| *B64D 13/02* | (2006.01) |
| *B64D 13/06* | (2006.01) |
| *F28D 21/00* | (2006.01) |

(52) U.S. Cl.
CPC ............ *B64D 13/08* (2013.01); *B64D 13/02* (2013.01); *B64D 2013/0618* (2013.01); *F28D 2021/0021* (2013.01)

(58) Field of Classification Search
CPC .................... B64D 13/08; B64D 13/02; B64D 2013/0618; F28D 2021/0021
See application file for complete search history.

(56) References Cited

U.S. PATENT DOCUMENTS

| | | | |
|---|---|---|---|
| 4,765,131 A * | 8/1988 | Benson | G05D 7/03 60/782 |
| 6,981,388 B2 | 1/2006 | Brutscher et al. | |
| 6,988,376 B2 | 1/2006 | Brutscher et al. | |
| 9,382,841 B2 * | 7/2016 | Bruno | F02C 6/08 |
| 9,623,974 B2 | 4/2017 | Johnson | |
| 9,656,756 B2 | 5/2017 | Atkey | |
| 2005/0011217 A1 * | 1/2005 | Brutscher | B64D 13/08 62/402 |
| 2008/0022688 A1 * | 1/2008 | Decrisantis | F28F 9/0265 60/751 |
| 2012/0279698 A1 | 11/2012 | Lau et al. | |
| 2017/0137132 A1 | 5/2017 | Wiegers et al. | |
| 2018/0057170 A1 * | 3/2018 | Sautron | F02C 6/08 |

FOREIGN PATENT DOCUMENTS

| | | |
|---|---|---|
| EP | 0511935 A1 | 11/1992 |
| WO | WO2018038876 A2 | 3/2018 |

OTHER PUBLICATIONS

Extended European Search Report for EP Application No. 19162548.2, dated Jul. 25, 2019, pp. 8.

* cited by examiner

*Primary Examiner* — Steven B McAllister
*Assistant Examiner* — Charles R Brawner
(74) *Attorney, Agent, or Firm* — Kinney & Lange, P. A.

(57) ABSTRACT

A bleed air control system and method include first and second flow paths, first and second flow control valves, and a controller. The first flow path is configured to carry a first bleed air flow and includes a heat transfer device configured to transfer heat to or from the first bleed air flow. The second flow path is configured to carry a second bleed air flow. The first and second flow paths merge downstream to provide a combined bleed air flow. The first flow control valve is positioned to control the first bleed air flow, and the second flow control valve is positioned to control the second bleed air flow. The controller is configured to control the first and second flow control valves to control a temperature and flow of the combined bleed air flow.

11 Claims, 2 Drawing Sheets

BLEED AIR TEMPERATURE AND FLOW CONTROL SYSTEM

BACKGROUND

The present invention relates generally to environmental control systems, and in particular to a system and method of controlling a temperature and flow of bleed air provided to environmental control systems.

Aircraft environmental control systems often utilize air-to-air heat exchangers to cool bleed air from the aircraft engines using ram air. Bleed air is traditionally provided to the environmental control system heat exchangers through a single flow control valve. If the flow control valve fails, bleed air is completely cut off from the environmental control system. It is desirable to eliminate the single point failure of the bleed flow control valve.

The cooled bleed air is eventually used for cooling within the aircraft, such as in the aircraft cabin, or for cooling aircraft electronics. Ram air is received at a ram air inlet and drawn through the heat exchangers to provide cooling for the bleed air. A ram air inlet valve, such as a ram door, is positioned at the ram air inlet to control the flow of ram air to the heat exchangers. The temperature of the bleed air can therefore be controlled by adjusting the position of the ram air inlet valve to reduce or increase the flow of ram air to the heat exchangers. However, controlling temperature using the ram door can lead to undesirable error in the downstream temperature of the bleed flow. It is desirable to decrease this error in downstream temperature of the bleed air.

SUMMARY

A system includes a controller, a bleed air source, and first and second flow paths. The first flow path is configured to carry a first bleed air flow from the bleed air source, and the second flow path is configured to carry a second bleed air flow from the bleed air source. The first and second flow paths merge downstream to provide a combined bleed air flow. The controller is configured to control the first bleed air flow and the second bleed air flow to control a temperature and flow of the combined bleed air flow.

A method includes directing, from a bleed air source, a first bleed air flow to a first bleed air path; directing, from the bleed air source, a second bleed air flow to a second bleed air path; merging the first and second bleed air flows to form a combined bleed air flow; and controlling, by a controller, the first and second bleed air flows to control a temperature and flow of the combined bleed air flow.

An aircraft bleed air control system includes first and second flow paths, first and second flow control valves, and a controller. The first flow path is configured to carry a first bleed air flow and includes a heat transfer device configured to transfer heat to or from the first bleed air flow. The second flow path is configured to carry a second bleed air flow. The first and second flow paths merge downstream to provide a combined bleed air flow. The first flow control valve is positioned to control the first bleed air flow, and the second flow control valve is positioned to control the second bleed air flow. The controller is configured to control the first and second flow control valves to control a temperature and flow of the combined bleed air flow.

DETAILED DESCRIPTION

A system and method are disclosed herein for controlling a temperature of bleed air provided to an aircraft environmental control system (ECS) while providing a backup flow path for bleed air upon failure of a flow control valve. The system includes first and second bleed air paths that receive bleed air from a bleed air source, such as a main aircraft engine. First and second flow control valves are positioned in the respective first and second bleed air paths to control the flow of bleed air through each path. The paths are merged into a combined bleed air flow that is provided to heat exchangers of the ECS. A temperature of the combined bleed air flow is monitored by a controller, which is configured to control the first and second flow control valves to control the temperature of the combined bleed air flow. One of the first and second flow paths may also include a heat exchanger to provide further cooling for the respective bleed air flow, or a heater to provide heating to the respective bleed air flow. By controlling the temperature of the bleed air provided to the ECS heat exchangers, the final temperature of the air provided to the aircraft cabin, for example, can be more finely controlled.

Figure 1:
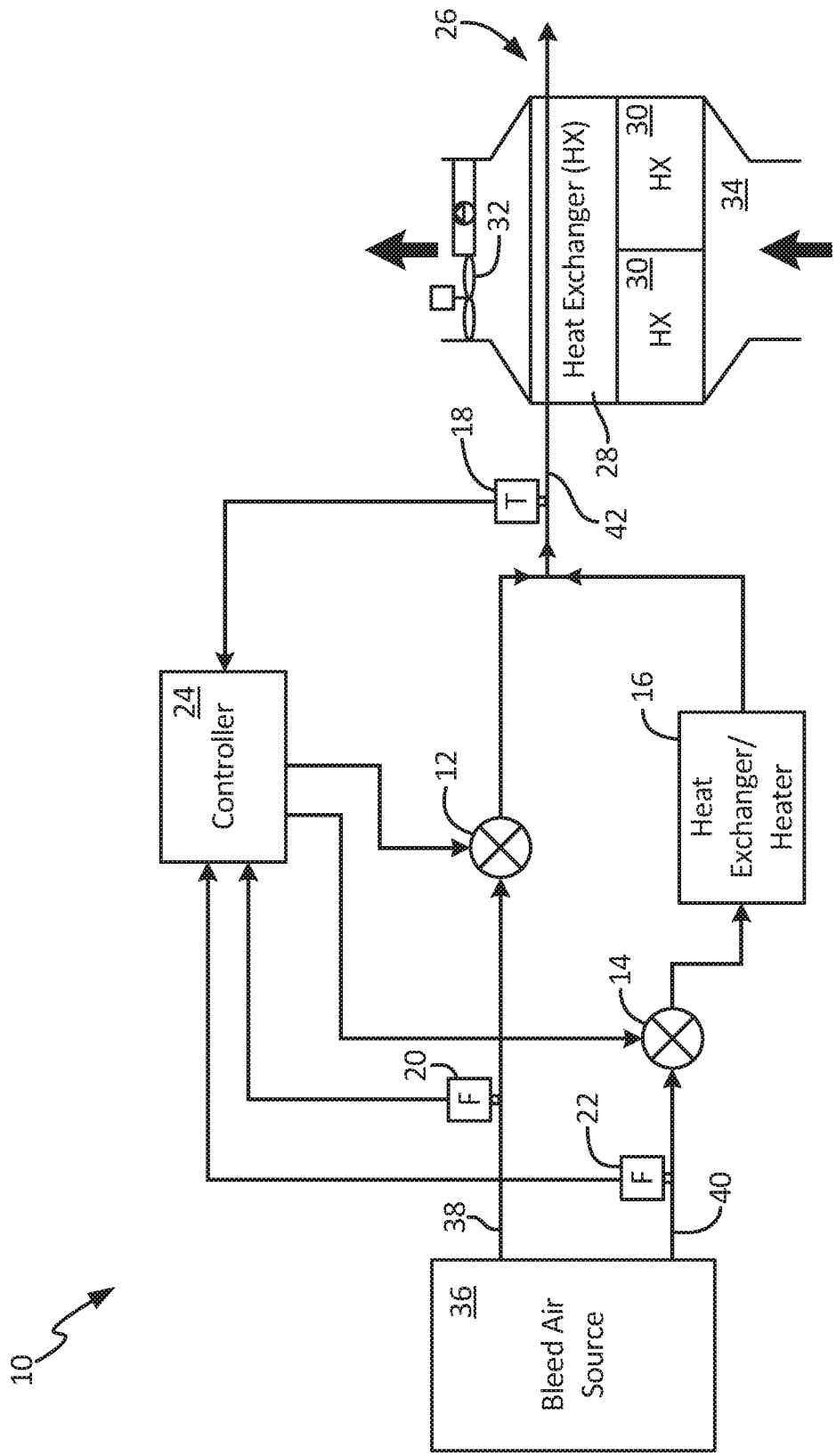
FIG. 1 is a block diagram illustrating a system for controlling a temperature within an aircraft environmental control system.

FIG. 1 is a line diagram illustrating system 10 for controlling a temperature of a bleed air flow provided to an aircraft environmental control system (ECS). System 10 includes flow control valves 12 and 14, heat transfer device 16, temperature sensor 18, flow sensors 20 and 22, controller 24, and downstream ECS components 26. Downstream ECS components 26 includes heat exchangers 28 and 30, and ram air fan 32. Ram air fan 32 may be operated to provide an airflow through heat exchangers 28 and 30 from ram air inlet 34. Heat exchanger 28, which may be a primary heat exchanger, may be configured to provide air-to-air cooling for the initial bleed air flow provided to ECS components 26 from combined flow 42, for example. Heat exchangers 30 may be a secondary heat exchanger, a liquid heat exchanger, or a combination thereof, for providing further cooling for bleed air flow within the ECS.

Bleed air is received by system 10 from bleed air source 36, which may be any source of bleed air such as an aircraft engine compressor, for example. Bleed air is provided to first bleed air path 38 and second bleed air path 40 from bleed air source 36. Bleed air paths 38 and 40 may be formed using any type ducting, for example, or any other method of transporting bleed air. Bleed air from bleed air paths 38 and 40 is combined downstream into a combined bleed air flow 42, which is provided to downstream ECS components 26. Temperature sensor 18 is positioned to sense a temperature of combined bleed air flow 42 and provide the sensed value to controller 24. Flow sensor 20 is positioned to sense a flow of bleed air in first bleed air path 38, and flow sensor 22 is positioned to sense a flow of bleed air in second bleed air path 40. The two sensed flows are also provided to controller 24. Flow sensors 20 and 22 are any mechanical, electrical, optical, or other devices configured to sense a fluid flow through paths 38 and 40. While illustrated as separate flow sensors, in another embodiment, a single flow sensor may be implemented upstream of bleed air source 36, but prior to the bleed air flow splitting into bleed air paths 38 and 40.

Flow control valve 12 is positioned to control a flow of bleed air through bleed air path 38, and flow control valve 14 is positioned to control a flow of bleed air through bleed air path 40. Flow control valves 12 and 14 may be any electrically or pneumatically actuated valves configured to regulate the flow of fluid through respective flow paths 38 and 40. For example, flow control valves 12 and 14 may be mechanical valves configured to control a mass flow rate of the bleed air flow in respective flow paths 38 and 40.

Heat transfer device 16 is positioned within bleed air path 40. While illustrated in FIG. 1 as downstream of flow control valve 14, heat transfer device 16 may also be positioned within bleed air path 40 upstream of flow control valve 14. While depicted as larger in FIG. 1, heat transfer device 16 may be sized significantly smaller than heat exchangers 28 and/or 30. In one embodiment, heat transfer device 16 is a heat exchanger or any other device capable of transferring heat from the fluid flowing in bleed air path 40. In other embodiments, heat transfer device 16 may be a heater or any other device capable of transferring heat to the fluid flowing in bleed air path 40. In either embodiment, heat transfer device 16 may be used to adjust the temperature of the bleed air in bleed air path 40 such that the temperature is different from the temperature of the bleed air in bleed air path 38.

Controller 24, which may be integrated into a pack controller for the environmental control system, integrated into another aircraft controller, or may be a standalone controller, is configured to control flow control valves 12 and 14 to control the final bleed air flow and temperature in combined flow path 42. Controller 24 may be any digital logic circuit capable of generating control signals based upon received sensed values.

Flow sensors 20 and 22 may be positioned and configured to provide a sensed signal indicative of the fluid flow through each respective path 38 and 40 to controller 24. Controller 24 also receives a signal indicative of a temperature of combined flow 42 from temperature sensor 42. Controller 24 has desired values for the mass flow rate and temperature of the bleed air in combined bleed air path 42. Controller 24 may determine these desired values itself based upon the needs of ECS 10, or may receive these desired value from a separate pack controller, for example. Controller 24 controls flow control valves 12 and 14 to achieve the desired flow at combined flow 42.

Controller 24 also controls valves 12 and 14 to control the temperature of combined flow 42. The temperature of combined flow 42 is based upon the temperature of the respective bleed air flows in bleed air paths 38 and 40. For example, heat transfer device 16 provides some cooling or some heating for the bleed air in path 40 such that the temperature of the bleed air flow in path 40 is lower or higher than the temperature of the bleed air flow in path 38 at the same flow rate. Controller 24 reads the temperature at temperature sensor 18 and then controls valves 12 and 14 to increase or decrease the respective flows within flow paths 38 and 40. For example, if controller 24 wants to reduce the temperature of combined flow 42, controller 24 may increase the flow through valve 14 and decrease the flow through valve 12. Controller 24

In addition to temperature control, system 10 provides redundant flow paths for bleed air, which eliminates the single point failure present in prior art systems. If one of flow control valves 12 or 14 breaks, controller 24 is able to control the working valve to continue providing bleed air to ECS components 26. While this eliminates the ability to control the temperature of combined bleed flow 42, it allows bleed air to continue to be provided to downstream ECS components 26 even upon failure of one of flow control valves 12 or 14. This eliminates the single point failure of prior art systems that included a single bleed air path through a single fluid control valve, and allows ECS 10 to continue to provide cool air upon failure of one of valves 12 and 14.

Figure 2:
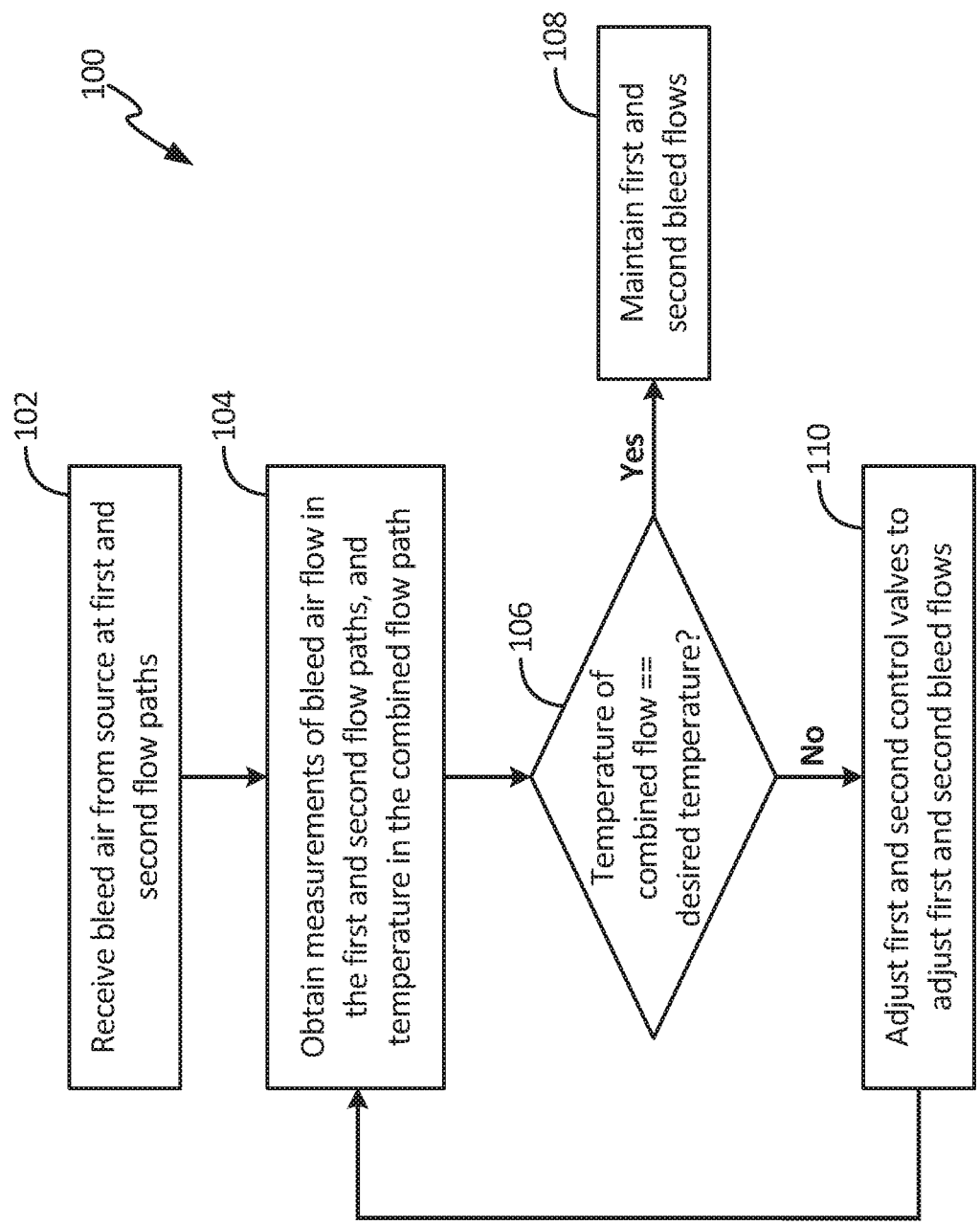
FIG. 2 is a flow chart illustrating a method of controlling a temperature of bleed air provided to an aircraft environmental control system.

FIG. 2 is a flowchart illustrating method 100 of controlling a temperature of a bleed air flow provided to an environmental control system. At step 102, bleed air is received from bleed air source 36 at first and second bleed air flow paths 38 and 40. At step 104, controller 24 obtains sensed flows from flow sensors 20 and 22, and a sensed temperature from temperature sensor 18.

Controller 24 is configured to adjust the temperature of bleed air in combined flow path 42. In one example embodiment, controlling a ram inlet door to control the flow of ram air to heat exchangers 28 and 30, a downstream temperature in ECS 10 may be controlled to a desired temperature having an error of +/−2° C. Control of the temperature of the bleed air in combined flow path 42 may then be used to fine tune the temperature of the bleed air provided to ECS 10 to reduce the error in the downstream temperature. Fine tuning the temperature may reduce the error from +/−2° C. to +/−0.5° C. In other embodiments, these temperature ranges may vary based on the system and environment.

For example, if the actual downstream temperature is greater than the desired downstream temperature after controlling the ram inlet door, controller 24 may control fluid control valve 14 to increase the flow of bleed air through heat transfer device 16 and may control fluid control valve 12 to decrease the flow of bleed air through flow path 38. This way, the same flow can be achieved at combined flow path 42 while reducing the temperature of bleed air at combined flow path 42. This can fine tune the bleed air temperature in order to fine tune the downstream temperature to the desired value without the need for a dedicated temperature control valve.

If the temperature of the bleed air in combined flow path 42 is at what controller 24 desires, method 100 proceeds to step 108 and holds the bleed flow constant by holding control valves 12 and 14 constant. If the temperature of the bleed air in combined flow path 42 is not equal to the desired value, method 100 proceeds to step 110. At step 110, controller 24 controls first control valve 12 and second control valve 14 to increase or decrease the respective flows through respective flow paths 38 and 40 in order to adjust the bleed air temperature within combined flow path 42 while maintaining the total flow. Method 100 returns to 104 to determine if the flow and temperature are as desired.

Discussion of Possible Embodiments

A system includes a controller, a bleed air source, and first and second flow paths. The first flow path is configured to carry a first bleed air flow from the bleed air source, and the second flow path is configured to carry a second bleed air flow from the bleed air source. The first and second flow paths merge downstream to provide a combined bleed air flow. The controller is configured to control the first bleed air flow and the second bleed air flow to control a temperature and flow of the combined bleed air flow.

The system of the preceding paragraph can optionally include, additionally and/or alternatively, any one or more of the following features, configurations and/or additional components:

A further embodiment of the foregoing system, wherein a flow heat exchanger is positioned within the second flow path to provide cooling for the second bleed air flow.

A further embodiment of any of the foregoing systems, further including a first flow control valve positioned in the first flow path, wherein the controller is further configured to control the first flow control valve to control the first bleed air flow; and a second flow control valve positioned in the second flow path, wherein the controller is further configured to control the second flow control valve to control the second bleed air flow.

A further embodiment of any of the foregoing systems, further including a first flow sensor positioned in the first flow path between the bleed air source and the first flow control valve and configured to sense the first bleed air flow and provide a first sensed flow to the controller; and a second flow sensor positioned in the second flow path between the bleed air source and the second flow control valve and configured to sense the second bleed air flow and provide a second sensed flow to the controller.

A further embodiment of any of the foregoing systems, further including a temperature sensor positioned in the combined bleed air flow and configured to sense the temperature of the combined bleed air flow and provide a sensed temperature to the controller.

A further embodiment of any of the foregoing systems, wherein the controller is configured to control the first and second flow control valves based on the first and second sensed flows and the sensed temperature.

A further embodiment of any of the foregoing systems, wherein the combined bleed air flow is provided to a primary heat exchanger of an aircraft environmental control system.

A further embodiment of any of the foregoing systems, wherein a flow heater is positioned within the second flow path to provide heating for the second bleed air flow.

A method includes directing, from a bleed air source, a first bleed air flow to a first bleed air path; directing, from the bleed air source, a second bleed air flow to a second bleed air path; merging the first and second bleed air flows to form a combined bleed air flow; and controlling, by a controller, the first and second bleed air flows to control a temperature and flow of the combined bleed air flow.

The method of the preceding paragraph can optionally include, additionally and/or alternatively, any one or more of the following features, configurations and/or additional components:

A further embodiment of the foregoing method, further including cooling, by a flow heat exchanger positioned within the second bleed air path, the second bleed air flow.

A further embodiment of any of the foregoing methods, wherein controlling, by the controller, the first and second bleed air flows includes controlling, by the controller, a first flow control valve positioned in the first bleed air path to control the first bleed air flow; and controlling, by the controller, a second flow control valve positioned in the second bleed air path to control the second bleed air flow.

A further embodiment of any of the foregoing methods, further including sensing, by a first flow sensor positioned in the first flow path between the bleed air source and the first flow control valve, the first bleed air flow as a first sensed flow; and sensing, by a second flow sensor positioned in the second flow path between the bleed air source and the second flow control valve, the second bleed air flow as a second sensed flow.

A further embodiment of any of the foregoing methods, further including sensing, by a temperature sensor positioned in the combined bleed air flow, the temperature of the combined bleed air flow as a sensed temperature.

A further embodiment of any of the foregoing methods, wherein controlling, by the controller, the first and second bleed air flows to control the temperature of the combined bleed air flow further comprises controlling, by the controller, the first and second flow control valves based on the first and second sensed flows and the sensed temperature.

A further embodiment of any of the foregoing methods, further including heating, by a flow heater positioned within the second bleed air path, the second bleed air flow.

An aircraft bleed air control system includes first and second flow paths, first and second flow control valves, and a controller. The first flow path is configured to carry a first bleed air flow and includes a heat transfer device configured to transfer heat to or from the first bleed air flow. The second flow path is configured to carry a second bleed air flow. The first and second flow paths merge downstream to provide a combined bleed air flow. The first flow control valve is positioned to control the first bleed air flow, and the second flow control valve is positioned to control the second bleed air flow. The controller is configured to control the first and second flow control valves to control a temperature and flow of the combined bleed air flow.

The system of the preceding paragraph can optionally include, additionally and/or alternatively, any one or more of the following features, configurations and/or additional components:

A further embodiment of the foregoing system, further including a first flow sensor positioned in the first flow path and configured to sense the first bleed air flow and provide a first sensed flow to the controller; a second flow sensor positioned in the second flow path and configured to sense the second bleed air flow and provide a second sensed flow to the controller; and a temperature sensor positioned in the combined bleed air flow and configured to sense the temperature of the combined bleed air flow and provide a sensed temperature to the controller; wherein the controller is configured to control the first and second flow control valves based on the first and second sensed flows and the sensed temperature.

A further embodiment of any of the foregoing systems, wherein the heat transfer device is a heat exchanger configured to transfer heat from the first bleed flow.

A further embodiment of any of the foregoing systems, wherein the heat transfer device is a heater configured to transfer heat to the first bleed flow.

A further embodiment of any of the foregoing systems, wherein the controller is configured to control the first control valve to provide the first bleed air flow as the combined bleed air flow upon failure of the second control valve, and wherein the controller is configured to control the second control valve to provide the second bleed air flow as the combined bleed air flow upon failure of the first control valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising: a controller; a bleed air source configured to provide bleed air; a first flow path configured to carry a first bleed air flow from the bleed air source; a first flow control valve positioned in the first flow path to control the first bleed airflow; a second flow path configured to carry a second bleed air flow from the bleed air source, wherein the first and second flow paths merge downstream to provide a combined bleed airflow path for the bleed air, wherein the first flow path and second flow path serve as redundant flow paths for the bleed air and a flow heater is positioned within the second flow path to provide heating for the second bleed air flow; and a second flow control valve positioned in the second flow path to control the second bleed flow; wherein the controller is configured to control the first bleed air flow and the second bleed air flow to control a temperature and bleed air flow through the combined bleed air flow path, and wherein the controller is configured to control the first flow control valve upon failure of the second control valve and wherein the controller is configured to control the second control valve upon failure of the first control valve.

2. The system of claim 1, further comprising: a first flow sensor positioned in the first flow path between the bleed air source and the first flow control valve and configured to sense the first bleed air flow and provide a first sensed flow to the controller; and a second flow sensor positioned in the second flow path between the bleed air source and the second flow control valve and configured to sense the second bleed airflow and provide a second sensed flow to the controller.

3. The system of claim 2, further comprising a temperature sensor positioned in the combined bleed air flow and configured to sense the temperature of the combined bleed airflow and provide a sensed temperature to the controller.

4. The system of claim 3, wherein the controller is configured to control the first and second flow control valves based on the first and second sensed flows and the sensed temperature.

5. The system of claim 1, wherein the combined bleed air flow is provided to a primary heat exchanger of an aircraft environmental control system.

6. A method comprising: directing, from a bleed air source, a first bleed air flow to a first bleed air path; directing, from the bleed air source, a second bleed air flow to a second bleed air path, wherein the first flow path and second flow path serve as redundant flow paths for the bleed air; heating, by a flow heater positioned within the second bleed air path, the second bleed air flow; merging the first and second bleed air flows to form a combined bleed air flow through a combined bleed air flow path; and controlling, by a controller, the first and second bleed air flows with a first flow control valve positioned in the first bleed air path and a second control valve positioned in the second bleed air path to control a temperature and flow of the combined bleed air flow through the combined bleed air flow path, wherein: controlling, by the controller, the first control valve upon failure of the second control valve; and controlling, by the controller, the second control valve upon failure of the second control valve.

7. The method of claim 6, further comprising: sensing, by a first flow sensor positioned in the first flow path between the bleed air source and the first flow control valve, the first bleed air flow as a first sensed flow; and sensing, by a second flow sensor positioned in the second flow path between the bleed air source and the second flow control valve, the second bleed airflow as a second sensed flow.

8. The method of claim 7, further comprising: sensing, by a temperature sensor positioned in the combined bleed air flow, the temperature of the combined bleed air flow as a sensed temperature.

9. The method of claim 8, wherein controlling, by the controller, the first and second bleed air flows to control the temperature of the combined bleed airflow further comprises controlling, by the controller, the first and second flow control valves based on the first and second sensed flows and the sensed temperature.

10. An aircraft bleed air control system comprising: a bleed air source configured to provide bleed air; a first flow path configured to receive bleed air from the bleed air source and to carry a first bleed airflow, wherein the first flow path includes a heat transfer device configured to transfer heat to or from the first bleed airflow and the heat transfer device is a heater configured to transfer heat to the first bleed flow; a second flow path configured to receive bleed air from the bleed air source and to carry a second bleed air flow, wherein the first flow path and second flow path serve as redundant flow paths for the bleed air and wherein the first and second flow paths merge downstream to provide a combined bleed air flow through a combined bleed airflow path; a first flow control valve positioned to control the first bleed air flow; a second flow control valve positioned to control the second bleed air flow; a controller configured to control the first and second flow control valves to control a temperature and flow of the combined bleed air flow and the controller is further configured to control the first control valve upon failure of the second control valve, and wherein the controller is configured to control the second control valve upon failure of the first control valve.

11. The aircraft bleed air control system of claim 10, further comprising: a first flow sensor positioned in the first flow path and configured to sense the first bleed air flow and provide a first sensed flow to the controller; a second flow sensor positioned in the second flow path and configured to sense the second bleed air flow and provide a second sensed flow to the controller; and a temperature sensor positioned in the combined bleed air flow and configured to sense the temperature of the combined bleed air flow and provide a sensed temperature to the controller; wherein the controller is configured to control the first and second flow control valves based on the first and second sensed flows and the sensed temperature.

* * * * *